(12) United States Patent
Cermak

(10) Patent No.: US 8,025,578 B2
(45) Date of Patent: Sep. 27, 2011

(54) WHEEL HUB/UNIVERSAL JOINT ASSEMBLY WITH END TEETH

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 451 days.

(21) Appl. No.: 12/093,446

(22) PCT Filed: Oct. 19, 2006

(86) PCT No.: PCT/EP2006/010073
§ 371 (c)(1),
(2), (4) Date: Oct. 13, 2008

(87) PCT Pub. No.: WO2007/054190
PCT Pub. Date: May 18, 2007

(65) Prior Publication Data
US 2009/0096278 A1    Apr. 16, 2009

(30) Foreign Application Priority Data

Nov. 11, 2005    (DE) .......................... 10 2005 054 283

(51) Int. Cl.
*F16D 1/06* (2006.01)

(52) U.S. Cl. ........................................ 464/178; 464/182

(58) Field of Classification Search .................. 464/149, 464/178, 182, 906; 384/544, 589; 301/111.03; 403/364
See application file for complete search history.

(56) References Cited

U.S. PATENT DOCUMENTS

| | | | |
|---|---|---|---|
| 1,660,792 A | | 2/1928 | Hirth |
| 4,460,058 A | * | 7/1984 | Welschof et al. ............. 464/906 |
| 4,893,960 A | * | 1/1990 | Beier et al. |
| 6,113,499 A | * | 9/2000 | Braun et al. |
| 6,413,008 B1 | | 7/2002 | van Dest et al. |
| 7,621,817 B2 | * | 11/2009 | Cermak ........................ 464/178 |
| 2007/0135220 A1 | | 6/2007 | Welschof |

FOREIGN PATENT DOCUMENTS

| | | |
|---|---|---|
| DE | 440 816 C | 2/1927 |
| DE | 31 16720 C1 | 4/1981 |
| DE | 3636243 A1 | 10/1986 |
| DE | 19751855 C1 | 4/1999 |
| DE | 10 2005 009 935 A1 | 3/2005 |
| DE | 10 2005 009 938 A1 | 3/2005 |
| DE | 103 38 172 B3 | 6/2005 |

* cited by examiner

*Primary Examiner* — Gregory Binda
(74) *Attorney, Agent, or Firm* — Kader, Fishman & Grauer, PLLC

(57) ABSTRACT

A wheel hub/universal joint assembly having a wheel hub with a wheel flange for connecting a wheel and with a sleeve portion for receiving a wheel bearing. A constant velocity universal joint is provided with an outer joint part, an inner joint part and torque transmitting elements. The outer joint part has a first face toothing with first teeth and wherein the sleeve portion has a second face toothing with second teeth, wherein the two sets of face toothings engage one another for torque transmitting purposes. Clamping means is also provided for axially clamping the wheel hub to the outer joint part, the clamping means being axially supported on the wheel hub and on the outer joint part 22. At least one of the two face toothings is provided such that the first and second teeth, when clamping together the assembly, contact one another first on the radial outside and, as the clamping operation progresses, also on the radial inside.

17 Claims, 3 Drawing Sheets

WHEEL HUB/UNIVERSAL JOINT ASSEMBLY WITH END TEETH

TECHNICAL FIELD

The invention relates to a wheel hub/universal joint assembly for connecting a wheel-related universal joint of a sideshaft of a motor vehicle to the wheel hub received by a wheel carrier of a vehicle. The wheel hub comprises a sleeve portion for receiving a wheel bearing which, in turn, is held in the wheel carrier, and a wheel flange for threading on a wheel, i.e. the central wheel disc.

BACKGROUND

From DE 103 38 172 B3 there is known a wheel hub/universal joint assembly wherein the outer joint part comprises a base with a formed-on journal. The journal is a short journal and extends only along part of the length of the bore of the wheel hub. For torque transmitting purposes, the bore comprises inner teeth which are engaged in a rotationally fixed way by the journal with corresponding outer teeth. For axial clamping purposes, there is provided a bolt which is centrally threaded into the journal and which is axially supported against a radial face of the wheel hub. The wheel bearing is axially pretensioned by the bolt. In the assembly with the short journal, the journal diameter of the universal joint, which journal diameter is dimensioned to ensure the required strength, determines the inner diameter of the bore of the wheel hub and thus indirectly the inner diameter of the wheel bearing.

SUMMARY OF THE INVENTION

DE 197 51 855 C1 proposes a wheel hub/universal joint assembly wherein the outer joint part is disc-shaped. For the purpose of transmitting torque to the wheel hub, there is provided an annular member which is connected in a rotationally fixed way by means of a face toothing to the outer joint part on the one hand and by means of longitudinal teeth to the wheel hub on the other hand. Axial fixing between the outer joint part and the annular member is effected by a securing ring. The annular member is axially fixed relative to the wheel hub by deforming a sleeve-shaped portion of the wheel hub, with the wheel bearing being axially pretensioned by the annular member.

From DE 36 36 243 A there is known a wheel hub/universal joint assembly wherein the wheel hub comprises a sleeve portion with a beaded collar to which there is axially fixed an inner bearing race of the wheel bearing. At its end, the beaded collar comprises a face toothing which, for torque transmitting purposes, engages a correspondingly designed face toothing at the outer joint part. The two sets of face toothings are positioned in a common radial plane.

DE 31 16 720 C1 proposes a bearing assembly of a wheel hub drivable via a constant velocity universal joint, wherein the wheel hub and the outer joint part, at an end face each, are connected to one another in a rotationally fixed way via a face toothing. The end face of the joint member is curved plate-like, so that, during assembly, the teeth first contact the outer diameter and subsequently the entire face. The tooth tip lines and the tooth root lines of the teeth extend parallel relative to one another.

In accordance with the invention, a wheel hub/universal joint assembly is provided with an axis of rotation A, comprising a wheel hub with a wheel flange for connecting a wheel and with a sleeve portion for receiving a wheel bearing; a constant velocity universal joint with an outer joint part, an inner joint part and torque transmitting elements; wherein the outer joint part, at its end facing the wheel hub, comprises a first face toothing with first teeth and wherein the sleeve portion, at its end facing the constant velocity universal joint, comprises a second face toothing with second teeth, wherein the two face toothings engage one another for torque transmitting purposes; clamping means for axially clamping the wheel hub to the outer joint part, which clamping means are axially supported on the wheel hub on the one hand and on the outer joint part on the other hand, wherein at least one of the two face toothings is designed in such a way that the first and second teeth, when clamping together the assembly, contact one another first on the radial outside and, as the clamping operation progresses, also on the radial inside, wherein the tooth tip lines and the tooth root lines of the at least one face toothing intersect one another in a point of intersection S positioned radially inside the face toothing.

The wheel hub/universal joint assembly is advantageous in that, in the clamped condition, the pair of toothings formed by the two face toothings carries its load nearly along the entire length of the individual teeth. The inwardly opening conical gap which still exists at the start of the clamping process between the two face toothings is closed by the outer joint part and the sleeve portion respectively being deformed. The resulting carrying contact between the face toothings along their entire radial extension results in a reduction in the load on the individual teeth and thus in low-tension conditions. Furthermore, as a result of the inventive design of the at least one face toothing, there is achieved, in an advantageous way, a slight resilient effect of the assembly in the axial direction. This results in an increase in clamping safety. Overall, said characteristics result in a particularly high torsional stiffness and bending stiffness between the universal joint and the wheel hub. Referring to at least one face toothing means that either only one of the two face toothings is designed in accordance with the invention, whereas the other face toothing is positioned in a radial plane, or that both face toothings are provided in accordance with the invention.

With reference to the axis of rotation A, the at least one face toothing preferably comprises radially extending teeth and tooth gaps, with the counter teeth also comprising radially extending teeth. However, different solutions are also conceivable; for example the at least one face toothing can also comprise circumferentially distributed groups of teeth which extend parallel relative to one another and which are designed in accordance with the invention. The counter teeth would then, accordingly, also be provided with groups of parallel teeth.

According to one embodiment, the height of the teeth of the at least one face toothing, with reference to the axis of rotation A, decreases from the radial outside to the radial inside. Furthermore, the teeth of the first one of the face toothings comprise tooth tip lines which, in the unclamped condition, comprise a shorter distance from the tooth root lines of the opposed second face toothing on the radial outside than on the radial inside. Furthermore, the tooth root lines of the first face toothing comprise a shorter distance from the tooth tip lines of the second face toothing on the radial outside than on the radial inside. This embodiment ensures that the teeth, by means of their tooth flanks, first contact the counter teeth on the radial outside, with the tooth flanks, as the clamping process progresses, carrying their loads over an increasing length. Assuming that there have been provided approximately straight tooth tip lines, an imaginary face formed by the tooth tip lines is conical and opens inwardly.

According to another embodiment, the point of intersection S of the tooth tip lines and of the tooth root lines is positioned on the axis of rotation A. The two face toothings are preferably identical, with the tooth tip lines and the tooth root lines of the first teeth intersecting one another in a first point of intersection S1 and with the tooth tip lines and the tooth root lines of the second teeth intersecting one another in a second point of intersection S2, wherein the two points of intersection S1, S2, at the start of the clamping process, are located at an axial distance from one another, which axial distance decreases as the clamping process progresses.

The first and the second teeth of the face toothings, in the clamped condition, may contact one another nearly along the entire length of their tooth flanks. In one embodiment, the first and the second teeth already contact one another along the entire length of their tooth flanks when approximately 75% of the nominal clamping force has been reached.

According to the present invention, the sleeve portion, at its end facing the universal joint, may comprise an outwardly deformed beaded collar which clamps in an inner bearing race of the wheel bearing, with the second face toothing being provided at this beaded collar. The outer joint part preferably comprises a central bore which is engaged by the clamping means. The clamping means can be provided in the form of a solid bolt or in the form of a hollow bolt which is threaded into the bore. When using a hollow bolt, it is particularly advantageous in respect of the stiffness of the assembly if an inner diameter of the bore approximately corresponds to an inner diameter of the sleeve portion.

DESCRIPTION

Figure 1:
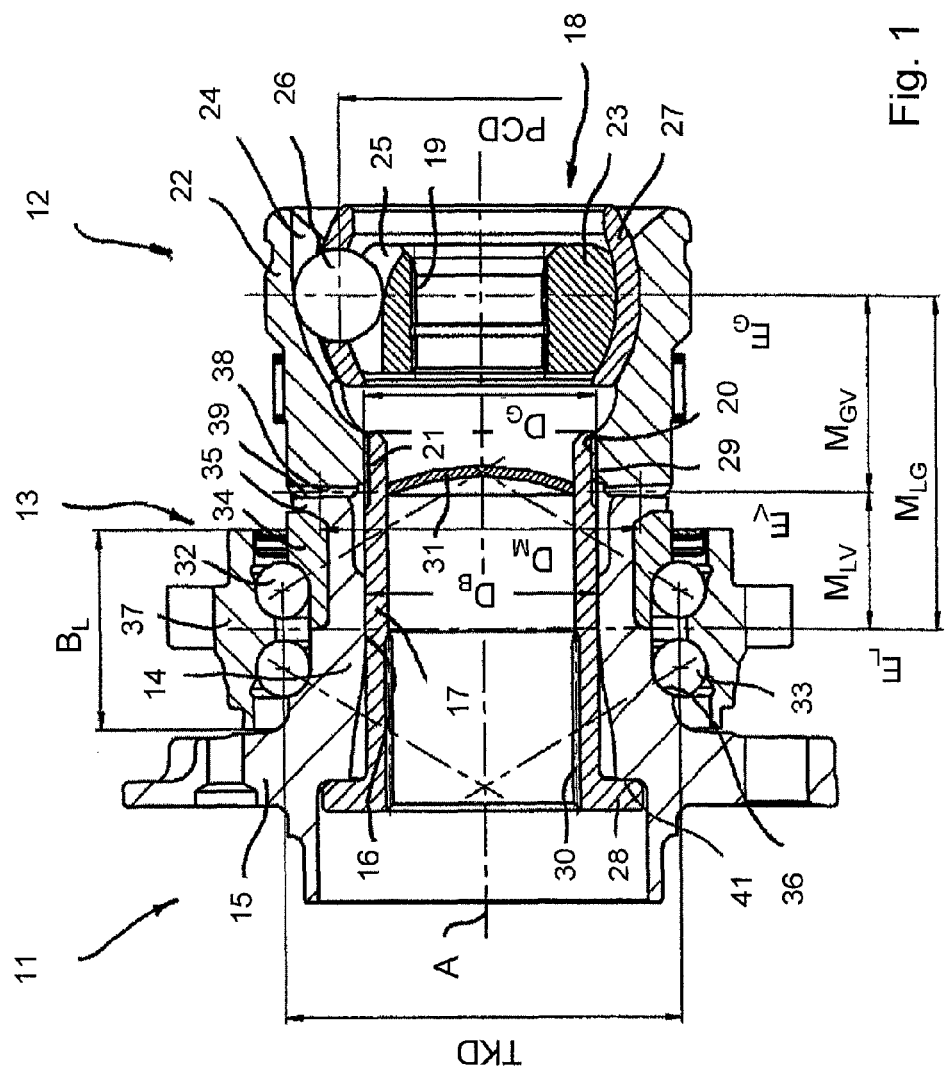
FIG. 1 is a longitudinal section through an inventive wheel hub/universal joint assembly in a first embodiment.

FIG. 1 shows a wheel hub/universal joint assembly which comprises a wheel hub 11, a constant velocity universal joint 12 and a wheel bearing 13 as components. The wheel hub 11 comprises a sleeve portion 14 for accommodating the wheel bearing 13, and a wheel flange 15 for bolting on the wheel disc of a wheel. The sleeve portion 14 comprises a through-aperture 16 through which there pass clamping element (means) 17 for axially clamping the wheel hub 11 to the constant velocity universal joint 12.

The constant velocity universal joint 12 comprises an outer joint part 22 with outer ball tracks 24, an inner joint part 23 with inner ball tracks 25, torque transmitting balls 26 each arranged in a pair of an opposed outer and inner ball track 24, 25, as well as a cage 27 holding the balls 26 in an angle-bisecting plane. In the joint shown here, the pairs of ball tracks 24, 25 widen from the wheel hub 11 away towards a first aperture 18. The inner joint part 23 comprises a central bore 19 with longitudinal teeth into which there may be inserted a sideshaft in a rotationally fixed way. Furthermore, the outer joint part 22 comprises a second aperture 20 which is opposed to the first aperture 18, which is arranged at the wheel hub end and which comprises an inner thread 21 which is engaged by the clamping element (means) 17.

The clamping element (means) 17 are provided in the form of a hollow bolt and comprise an annular flange 28 which is axially supported on a radial supporting face 41 of the wheel hub 11 and comprises an outer thread 29 which is threaded into the inner thread 21 of the outer joint part 22. For threading-in purposes and for axially clamping the wheel hub 11 to the constant velocity joint 12, the hollow bolt 17, at the flange end, comprises splines 30 into which there can be inserted a key with corresponding splines. The hollow bolt 17 comprises a clearance fit relative to the through-aperture 16, so that, when carrying out the axial clamping operation, no additional torsional forces—with the exception of threading forces—disadvantageously affect the hollow bolt 17. In the inner cross-section of the hollow bolt, near the outer thread 29, there is inserted a cover 31 for sealing the constant velocity universal joint 12 relative to the environment. At its shaft end, the constant velocity universal joint 12 is normally sealed by means of a convoluted boot assembly.

The wheel bearing 13 comprises two rows of bearing balls 32, 33 of which the bearing balls 32 at the joint end run in a separate inner bearing race 34 which is axially secured by an outwardly deformed beaded collar 35 of the sleeve portion 14. The bearing balls 33 at the hub end run in an inner bearing race 36 which is formed on an outer face of the wheel hub 11. Furthermore, the wheel bearing 13 comprises a common outer bearing race 37 which accommodates both rows of bearing balls 32, 33 and which may be inserted into a wheel carrier.

For torque transmitting purposes between the constant velocity universal joint 12 and the wheel hub 11, the outer joint part 22, at an end face surrounding the aperture 20, comprises a first face toothing 38 which, under axial pretension, engages a corresponding second face toothing 39 formed at the beaded collar 35 of the sleeve portion 14. Said axial pretensioning is effected by the hollow screw 17.

Figure 2:
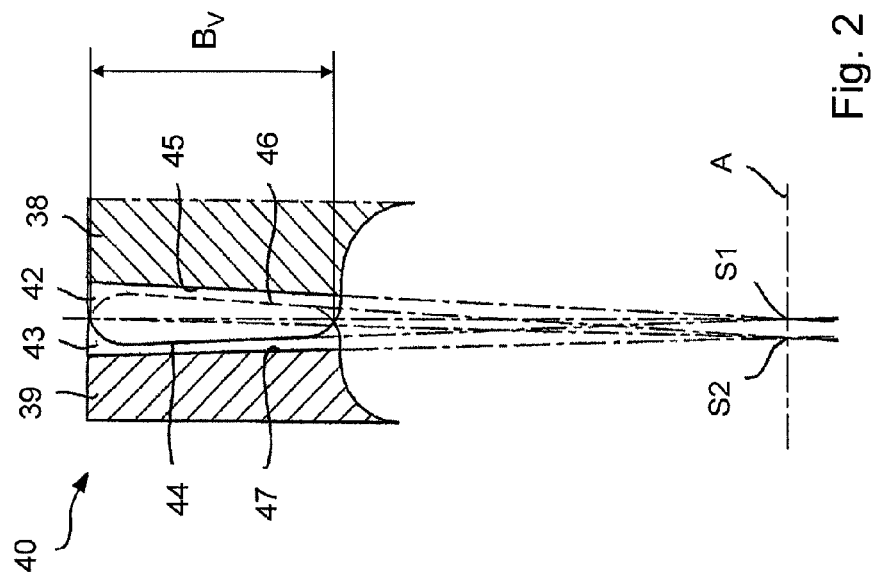
FIG. 2 is half a longitudinal section through the pair of toothings between the outer joint part and the wheel hub of FIG. 1 in the form of a detail in the unclamped condition.
Figure 3:
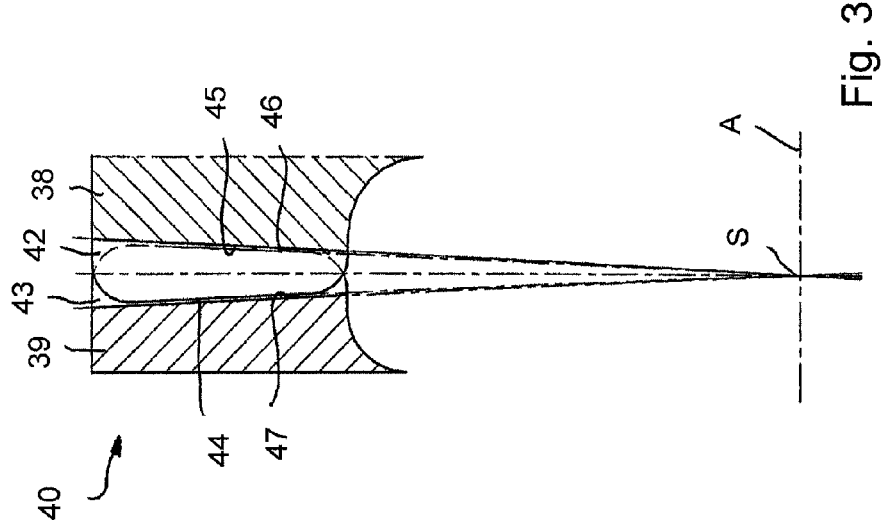
FIG. 3 shows the pair of toothings according to FIG. 2 in the clamped condition.

With reference to FIGS. 2 and 3, there will now follow a description of the pair of toothings 40 formed by the two face toothings 38, 39. It can be seen that the teeth 42 of the first face toothing 38 which, below, will be referred to as first teeth, and the teeth 43 of the second face toothing 39 which, below, will be referred to as second teeth, extend radially relative to the axis of rotation A. In the embodiment depicted, first and second face toothings 38, 39 are designed so as to correspond to one another. In a radial view and, respectively, in cylindrical sections, the face toothings 38, 39 comprise tooth flanks which extend approximately parallel relative to one another. The height of the first teeth 42 and of the second teeth 43 decreases from the radial outside to the radial inside with a reference to a plane extending perpendicularly relative to the axis of rotation A. In this way it is ensured that the first teeth 42, by means of their tooth flanks, initially contact the tooth flanks of the second teeth 43 on the radial outside, with the tooth flanks contacting one another as the clamping process progresses. It is proposed that the first and the second face toothings 38, 39 contact one another along the entire length of their tooth flanks when approximately 75% of the nominal clamping force has been reached.

The tooth tip lines 44, 46 in an unclamped position, as shown in FIG. 2, are positioned at a shorter distance from the tooth root lines of an opposed face toothing on a radial outside than on a radial inside. For example, as may be seen in FIG. 2, the axial distance between the tooth tip line 44 of part 38 is shorter radially outside than radially inside of the face toothing 39. It can be seen that the tooth tip lines 44 and the tooth root lines 45 of the first teeth 42 intersect one another in a first point of intersection S1 on the axis of rotation A and that the tooth tip lines 46 and the tooth root lines 47 of the second teeth 43 intersect one another in a second point of intersection S2. At the start of the clamping process, which is shown in FIG. 2, the two points of intersection S1, S2 are located at an axial distance from one another which decreases as the clamping process progresses. FIG. 3 shows the pair of toothings 40 in a fully axially clamped condition. It can be seen that the tooth tip lines 44 of the first face toothing 38 now extend parallel to the tooth root lines 47 of the second face toothing 39 and that the tooth root lines 45 of the first face toothing 38 now extend parallel to the tooth tip lines 46 of the second face toothing 39. Even in the fully clamped condition, the tooth tip lines 44, 46 are located at a short axial distance from the tooth root lines 45, 47 of the counter teeth, so that, with a clearance-free connection in the circumferential direction, there is achieved a slight axial spring effect Furthermore, said assembly is advantageous in that, in the axially clamped condition, the pair of toothings 40 carries its loads uniformly along its entire radial extension. These characteristics achieve a particularly high torsional stiffness and bending stiffness between the constant velocity universal joint 12 and the wheel hub 11.

Below there will be listed particularly advantageous size relationships of the wheel hub/universal joint assembly according to FIG. 1, with the abbreviations as used meaning the following:

PCD pitch circle diameter of the balls when the joint is in the unarticulated condition;
TKD pitch circle diameter of the wheel bearing;
$B_L$ width of wheel bearing
$B_V$ radial width of end teeth;
$D_M$ mean tooth diameter of face toothing;
$D_B$ bore diameter of through-aperture;
$D_G$ thread diameter
$M_{LG}$ distance between the centre plane ($E_L$) of the wheel bearing and the joint centre plane ($E_G$);
$M_{LV}$ distance between the centre plane ($E_L$) of the wheel bearing and the centre plane ($E_V$) of the face toothing;
$M_{GV}$ distance between the plane ($E_V$) of the face toothing and the joint centre plane ($E_G$).

It is particularly advantageous if the distance between the joint centre and the bearing centre, if divided by the sum of the pitch circle diameter of the balls and the length of the wheel bearing, is smaller than 0.7, i.e. $(M_{LG})/(PCD+B_L)<0.7$. In this way there is achieved a short distance between the constant velocity universal joint and the wheel bearing, so that the joint centre is positioned close to the expansion axis around which the wheel is pivoted in the case of a steering movement.

Furthermore, it is advantageous if the distance between the bearing centre and the centre plane of the face toothing if divided by the axial length of the wheel bearing is smaller than 0.67, i.e. $(M_{LV})/B_L<0.67$. In this case, too, the joint is connected close to the wheel bearing. This ratio is a measure for the influence of possible production inaccuracies on the bearings of the driveshaft and the joint respectively.

Furthermore, it is advantageous if the distance between the centre plane of the end teeth and the joint centre if divided by the pitch circle diameter of the joint balls is smaller than 0.74, i.e. $(M_{GV})/PCD<0.74$. This results in the joint being connected close to the pair of toothings. This ratio is a measure for the influence of possible production inaccuracies on the bearings of the driveshaft and the joint respectively.

Furthermore, it is advantageous if the ratio between the axial length of the wheel bearing and the mean diameter of the face toothing is smaller than 0.63, i.e. $B_L/D_M<0.63$. With reference to the mean diameter of the face toothing, this achieves a relatively short length of the wheel bearing in the axial direction.

Furthermore, it is advantageous if the ratio between the pitch circle diameter of the wheel bearing and the mean diameter of the face toothing is smaller than 1.26, i.e. $TKD_L/D_M<1.26$. This measure results in a compact wheel hub/universal joint assembly in the radial direction. This ratio represents the parameter for the transmission of torque. The torque is introduced into the wheel hub in the radial direction relatively close to the pitch circle diameter of the wheel bearing, thus achieving a high torsional stiffness.

Furthermore, it is advantageous if the ratio between the radial width and the mean diameter of the face toothing is smaller than 0.22, i.e. $B_V/D_M<0.22$. This measure achieves a relatively narrow pair of toothings in the axial direction, so that the face toothings carry their load uniformly along their entire radial extension.

Furthermore, it is advantageous if the ratio between the mean diameter of the face toothing and the inner diameter of the through-aperture is smaller than 1.5, i.e. $D_M/D_B<1.5$. This ratio presents a measure for the introduction of torque into from the outer joint part into the wheel hub, with said range achieving a particularly high torsional stiffness.

Furthermore, it is advantageous if the ratio between the mean diameter of the face toothing on the one hand and the diameter of the thread between the hollow screw and the outer joint part on the other hand is smaller than 1.6, i.e. $D_M/D_G<1.6$. This ratio represents a measure for the direct connection of the constant velocity universal joint to the wheel hub.

Furthermore, it is advantageous if the ratio between the inner diameter of the through-aperture on the one hand the diameter of the thread between the hollow bolt on the other hand is smaller than 1.2, i.e. $D_B/D_G<1.2$. In one exemplary embodiment, the inner diameter $D_G$ of the second aperture 20 corresponds to the inner diameter $D_B$ of the sleeve portion 14.

Figure 4:
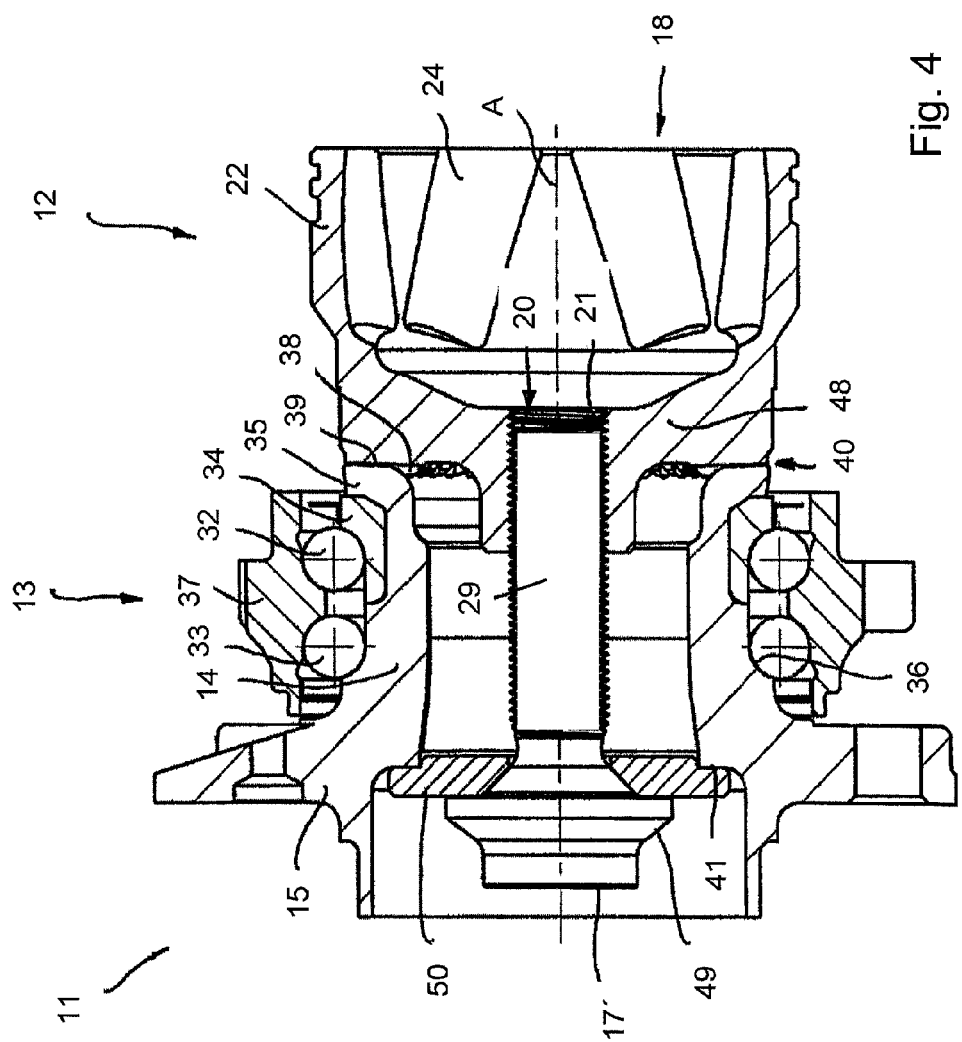
FIG. 4 is a longitudinal section through an inventive wheel hub/universal joint assembly in a second embodiment.

FIG. 4 shows a wheel hub/universal joint assembly in a second embodiment which largely corresponds to the assembly according to FIG. 1. Therefore, reference is made to the above description, wherein identical components have been given the same reference numbers, with deviating components having been given reference numbers with apostrophes. It can be seen that of the constant velocity universal joint 12', only the outer joint part 22' with its outer ball tracks 24' has been illustrated. The present constant velocity universal joint 12' is in the form of VL plunging joint known in itself, which is obvious from the outer ball tracks 24' extending at an angle relative to the axis of rotation A. The main difference from the above embodiment refers to the way in which the constant velocity joint 12' is clamped to the wheel hub 11'. In the present embodiment, the outer joint part 21', at its wheel hub end, comprises a base 48 with a central aperture 20' with an inner thread 21'. The clamping means 17' are provided in the form of a bolt which, by means of an outer thread 29', is threaded into the inner thread 21' of the outer joint part 22'. At its wheel hub end, the bolt 17' is axially supported by its head 49 against a clamping disc 50 which, in turn, is supported against the radial supporting face 41 of the wheel hub 11'. The pair of toothings 40 consisting of first and second toothings 38, 39 corresponds to that shown in FIGS. 1 to 3, to the description of which reference is therefore made. To that extent, the pair of toothings has the same above-mentioned advantages for the wheel hub/universal joint assembly.

The invention claimed is:

1. A wheel hub/universal joint assembly with an axis of rotation (A), comprising
    a wheel hub with a wheel flange for connecting a wheel and with a sleeve portion for receiving a wheel bearing;
    a constant velocity universal joint with an outer joint part, an inner joint part and torque transmitting elements;
    wherein said outer joint part, at its end facing said wheel hub, comprises a first face toothing with first teeth and wherein said sleeve portion, at its end facing said constant velocity universal joint, comprises a second face toothing with second teeth, wherein said first and second face toothings engage one another for torque transmitting purposes;
    clamping means for axially clamping said wheel hub to the outer joint part, said clamping means axially supported on said wheel hub and on said outer joint part,
    wherein at least one of said first and second face toothings is designed in such a way that said first and second teeth, when clamping together the assembly, contact one another first on a radial outside and, as the clamping operation progresses, also on a radial inside, wherein said first and second face toothings comprise tooth tip lines and tooth root lines, wherein said tooth tip lines and said tooth root lines intersect one another in a point of intersection (S),
    wherein said point of intersection (S) is positioned on the axis of rotation (A).

2. A wheel hub/universal joint assembly according to claim 1, wherein the tooth tip lines, in an unclamped condition, are positioned at a shorter distance from said tooth root lines of an opposed face toothing on a radial outside than on a radial inside.

3. A wheel hub/universal joint assembly according to claim 1 said tooth tip lines and said tooth root lines of said first teeth intersect one another in a first point of intersection (S1) and that said tooth tip lines and said tooth root lines of said second teeth intersect one another in a second point of intersection (S2), wherein the two points of intersection (S1, S2), upon the start of the clamping process, comprise an axial distance between one another which is reduced in size as the clamping process progresses.

4. A wheel hub/universal joint assembly according to claim 1, said first and second face toothings are designed so as to correspond to one another.

5. A wheel hub/universal joint assembly according to claim 1, wherein when in the clamped condition, said first and said second teeth of said first and second face toothings contact one another along the entire length of their tooth flanks.

6. A wheel hub/universal joint assembly according to claim 5,
    wherein said first and second face toothing comprise tooth flanks;
    wherein when already reaching approximately 75% of their nominal clamping force, said first and said second teeth of said first and second face toothings contact one another along the entire length of said tooth flanks.

7. A wheel hub-/universal joint assembly according to claim 1, wherein at its end facing said constant velocity universal joint, said sleeve portion comprises an outwardly formed beaded collar which clamps in an inner bearing race of the wheel bearing, wherein said second face toothing is provided at said beaded collar.

8. A wheel hub/universal joint assembly according to claim 1 wherein said outer joint part comprises a central bore which is engaged by the said clamping means.

9. A wheel hub/universal joint assembly according to claim 8, wherein said clamping means are provided in the form of a solid bolt which is threaded into said central bore.

10. A wheel hub/universal joint assembly according to claim 8, wherein said clamping means are provided in the form of a hollow bolt which is threaded into said central bore.

11. A wheel hub/universal joint assembly according to claim 10, wherein an inner diameter ($D_G$) of said central bore approximately corresponds to an inner diameter ($D_B$) of said sleeve portion.

12. A wheel hub/universal joint assembly with an axis of rotation (A) comprising:
    a wheel hub including a sleeve portion housing a wheel bearing;
    a constant velocity universal joint including an outer joint part, an inner joint part and torque transmitting elements;
    wherein said outer joint part comprises a first face toothing with first teeth;
    wherein said sleeve portion comprises a second face toothing with second teeth, said second face toothing engaging said first face toothing;
    a clamping element clamping said wheel hub to said outer joint part;
    wherein said first teeth and said second teeth contact one another first on a radial outside during initial clamping; and
    wherein said first teeth and said second teeth contact one another on a radial inside during further clamping;
    wherein said first and second face toothings comprise tooth tip lines and tooth root lines, said tooth tip lines and said tooth root lines intersecting one another in a point of intersection (S),
    wherein said point of intersection (S) is positioned on the axis of rotation (A).

13. A wheel hub/universal joint assembly with an axis of rotation (A) as described in claim 12:
    wherein the tooth tip lines in an unclamped condition, are positioned at a shorter distance from said tooth root lines of an opposed face toothing on a radial outside than on a radial inside.

14. A wheel hub/universal joint assembly with an axis of rotation (A) as described in claim 12:
    said tooth tip lines and said tooth root lines of said first teeth intersect one another in a first point of intersection (S1) and that said tooth tip lines and said tooth root lines of said second teeth intersect one another in a second point of intersection (S2), wherein the two points of intersection (S1, S2), upon the start of the clamping process, comprise an axial distance between one another which is reduced in size as the clamping process progresses.

15. A wheel hub/universal joint assembly with an axis of rotation (A) as described in claim 12:
    wherein when reaching approximately 75% of a nominal clamping force, said first and second teeth contact one another along their entire length.

16. A wheel hub/universal joint assembly with an axis of rotation (A) as described in claim 12:
    wherein at its end facing said constant velocity universal joint said sleeve portion comprises an outwardly formed beaded collar which clamps in an inner bearing race of the wheel bearing wherein said second face toothing is provided at said beaded collar.

17. A wheel hub/universal joint assembly with an axis of rotation (A) as described in claim 12:
    wherein said clamping element comprises a hollow bolt threaded into a central bore in said outer joint part, said central bore having an inner diameter ($D_G$) corresponding to an inner diameter ($D_B$) of said sleeve portion.

* * * * *